(12) United States Patent
Lu

(10) Patent No.: US 7,553,032 B2
(45) Date of Patent: Jun. 30, 2009

(54) IMAGING SYSTEM FOR AN OPTICAL ENGINE OF A PROJECTION APPARATUS

(75) Inventor: Chang-Hsing Lu, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 610 days.

(21) Appl. No.: 11/380,615

(22) Filed: Apr. 27, 2006

(65) Prior Publication Data
US 2007/0109503 A1 May 17, 2007

(30) Foreign Application Priority Data
Nov. 16, 2005 (TW) .............................. 94140347 A

(51) Int. Cl.
*G03B 21/28* (2006.01)
(52) U.S. Cl. ........................... 353/81; 348/771; 359/831
(58) Field of Classification Search .................. 353/33, 353/81; 348/771, 742, 743; 359/831
See application file for complete search history.

(56) References Cited

U.S. PATENT DOCUMENTS

| 6,185,047 B1 * | 2/2001 | Peterson et al. ............. 359/640 |
| 2007/0108028 A1 * | 5/2007 | Lu ........................... 200/16 C |

* cited by examiner

*Primary Examiner*—William C Dowling
(74) *Attorney, Agent, or Firm*—Patterson, Thuente, Skaar & Christensen, P.A.

(57) ABSTRACT

An imaging system for an optical engine of projection apparatus comprises a body, a prism device, a digital micromirror assembly, a projection lens assembly, and an illumination system. A first slide mechanism disposed between the prism device and the body enables the prism device and the body to move transversely, relative to each other, to form an adjustable distance between the projection lens assembly and the prism device. A second slide mechanism disposed between the digital micromirror assembly and the prism device enables the digital micromirror assembly and the prism device to move transversely, relative to each other, to form an adjustable relative position between an effective optical processing area of the digital micromirror assembly and the bottom of the prism device. Users or technicians may adjust the relative movement between the assemblies conveniently using the springs of a fastening device to fasten the prism device to the body. Likewise, the positioning devices of the fastening devices could be used to fasten the digital micromirror assembly and the body in position. Thus, the imaging system for the optical engine of the projection system can be precisely focused and positioned according to the aforementioned arrangement. Furthermore, not only is the operation and adjustment of the imaging system easy, quick, and inexpensive to perform, but also, the manufacture of parts is easy to manage and control.

20 Claims, 6 Drawing Sheets

IMAGING SYSTEM FOR AN OPTICAL ENGINE OF A PROJECTION APPARATUS

CROSS-REFERENCES TO RELATED APPLICATIONS

This application claims priority based on Taiwan Patent Application No. 094140347 filed on Nov. 16, 2005.

BACKGROUND OF THE INVENTION

1. Field of the Invention

The present invention relates to an imaging system, particularly, an imaging system for an optical engine of a projection apparatus. If one desires, a simple adjustment in the optical engine can result in a more precise focus and position of an output image.

2. Descriptions of the Related Art

Generally, there are two types of conventional internal projection systems; namely, a liquid crystal on silicon (LCOS) type and a digital light processing (DLP) type. Because of its high performance digital micromirror device (DMD) built into the DLP projection system, the DLP has become the more popular projection system of the two.

FIG. 1 shows a three-dimensional schematic view of a typical reflective digital light processing (DLP) projection apparatus. After a light beam for imaging is produced by an illumination system 190, it passes through a color wheel 191, emitting a light integration rod into a prism device 120. Both the light beam and imaging signals processed by a digital micromirror assembly (not illustrated), located under the prism device 120, pass through the prism device 120 and project onto a large size mirror (not illustrated) through a projection lens assembly 140. The image, as reflected from the mirror, is then projected onto a display screen. The prism device 120, the digital micromirror assembly, and the projection lens assembly 140, as a whole, are generally referred to as an imaging system 150.

FIG. 2 shows a planer schematic view of a typical transmissive DLP projection apparatus comprising a body 210, a projection lens assembly 240, and an illumination system 290. The DLP projection apparatus generates a light beam from the illumination system 290, while the body 210 projects a processed image onto a screen through the projection lens assembly 240. After a precise and delicate adjustment, the projection apparatus must be assembled very carefully to obtain a focused and precisely positioned image.

For example, the existing technology of adjusting the focus and the position of the image for a transmissive DLP projection apparatus is as follows: (1) provisionally fastening the illumination system 290 on one end of the body 210 with screws, (2) adjusting the position of the projection lens assembly 240 relative to the illumination system 290 step by step and with care to ensure proper focus and positioning of the image, and (3) screwing the projection lens assembly 240 on the body 210 with the tools. Understandably, many uncontrollable situations factor in during manual operation, as it indeed, takes time for the adjustment, positioning and fastening procedures. Moreover, when fastening the two machine parts with screws, the engaging force tends to change the previously well-adjusted distance, resulting in a shifted distance between the two parts. Therefore the output quality of the image of the projection apparatus is hard to control. In addition, as expected, applying the conventional manual adjustment and fastening procedures to the optical engine of a reflective DLP projection apparatus is even harder because the reflective DLP has more complicated structures than the structures of the transmissive DLP.

With the aforementioned limitations, the industrial field provides another way to adjust the focus and the position of the image with an adjustment fixture. The procedures are to assemble the projection lens assembly 240 on the body 210 with the screws, optimize the focus and the position of the image by adjusting the relative position of the illumination system 290 and the projection lens assembly 240 with the fixture, and then fix the relative position between the illumination system 290 on the body 210 by glue. Though the relative position of the illumination system 290 and the projection lens assembly 240 can be controlled by this measure, the adjustment fixture still needs to be designed individually. In addition, the procedure for operating the fixture during position adjustment is fairly complicated, thereby, resulting in longer adjustment time. Furthermore, the use of the specific, heat-resisting durable glue is very expensive and permanent. In other words, the relative position is impossible to adjust anymore once the glue is applied and cured. Overall, the cost for manufacturing and assembling a projection apparatus is not reduced.

As a result, the need for an improved imaging system structure that ensures a stable product quality for presenting an optimal output quality prior to factory release, becomes evident, as efficient procedures are desired to avoid complicated procedures, long operation time, high cost, and difficulty of controlling manufacture processes.

SUMMARY OF THE INVENTION

The primary objective of this invention is to provide an imaging system for the optical engine of a projection apparatus. Providing an adjustable transverse slide relation between a prism device and a body in the imaging system, while maintaining a constant, relative vertical distance between the prism device and a digital micromirror assembly enables ease and precision in focusing an image of the imaging system. Not only does this save the time of fabrication or repair, but it also reduces the production cost.

Another objective of this invention is to provide an imaging system for the optical engine of a projection apparatus. Providing an adjustable relative transverse slide relation between a prism device and a digital micromirror assembly in the imaging system enables a precise and easily positioned output image of the imaging system.

Yet a further objective of this invention is to provide an imaging system for the optical engine of a projection apparatus. Providing an adjustable relative transverse slide relation between a prism device and a body, as well as a relative transverse slide relation between a prism device and a digital micromirror assembly in the imaging system, enables ease and precision in focusing the image, thereby resulting in an image with a high quality output.

Further objectives and advantages for the present invention will become more apparent when considering the following drawings and ensuing descriptions.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
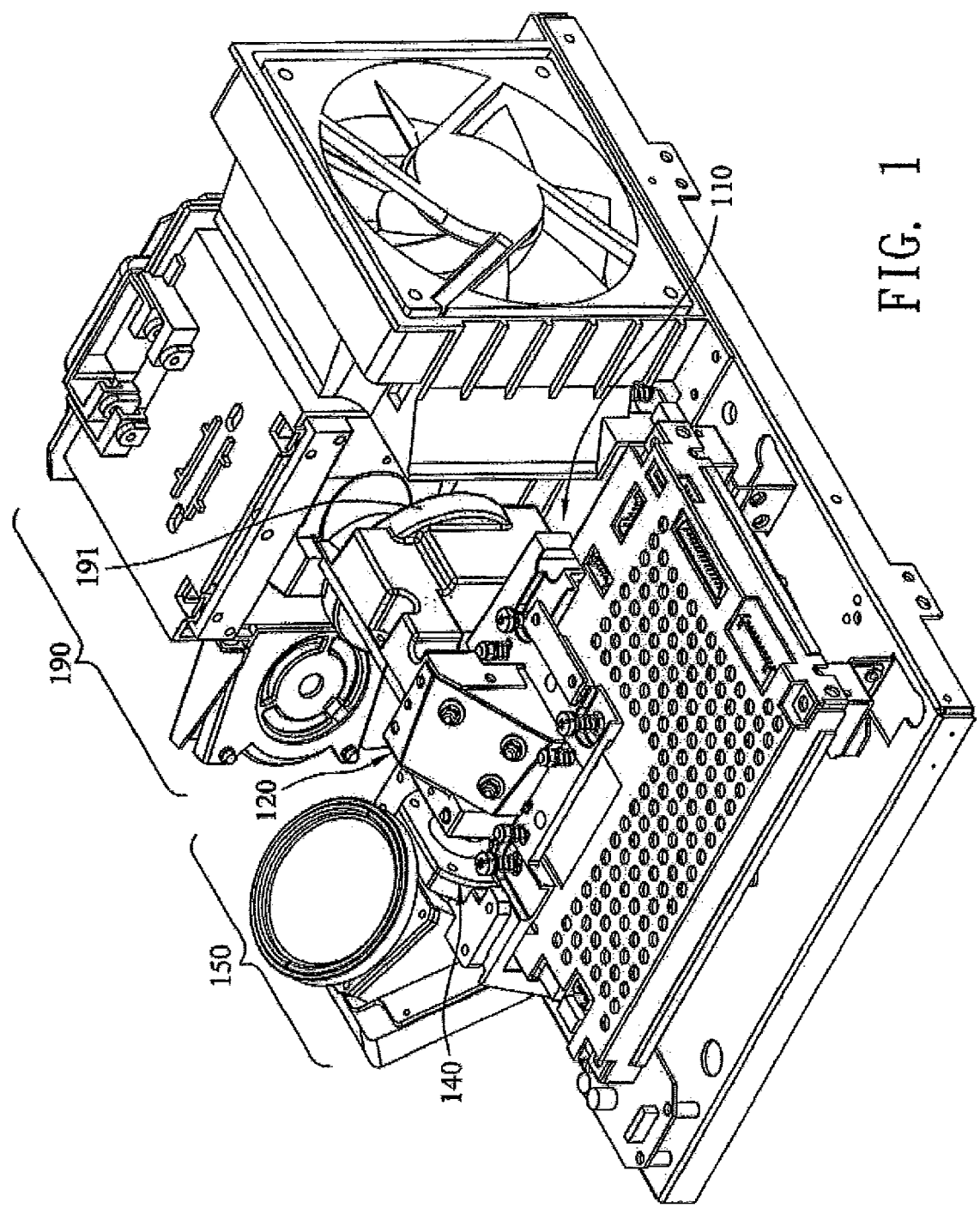
FIG. 1 shows a three dimensional schematic view of the optical engine of a typical reflective digital light processing (DLP) projection apparatus.
Figure 2:
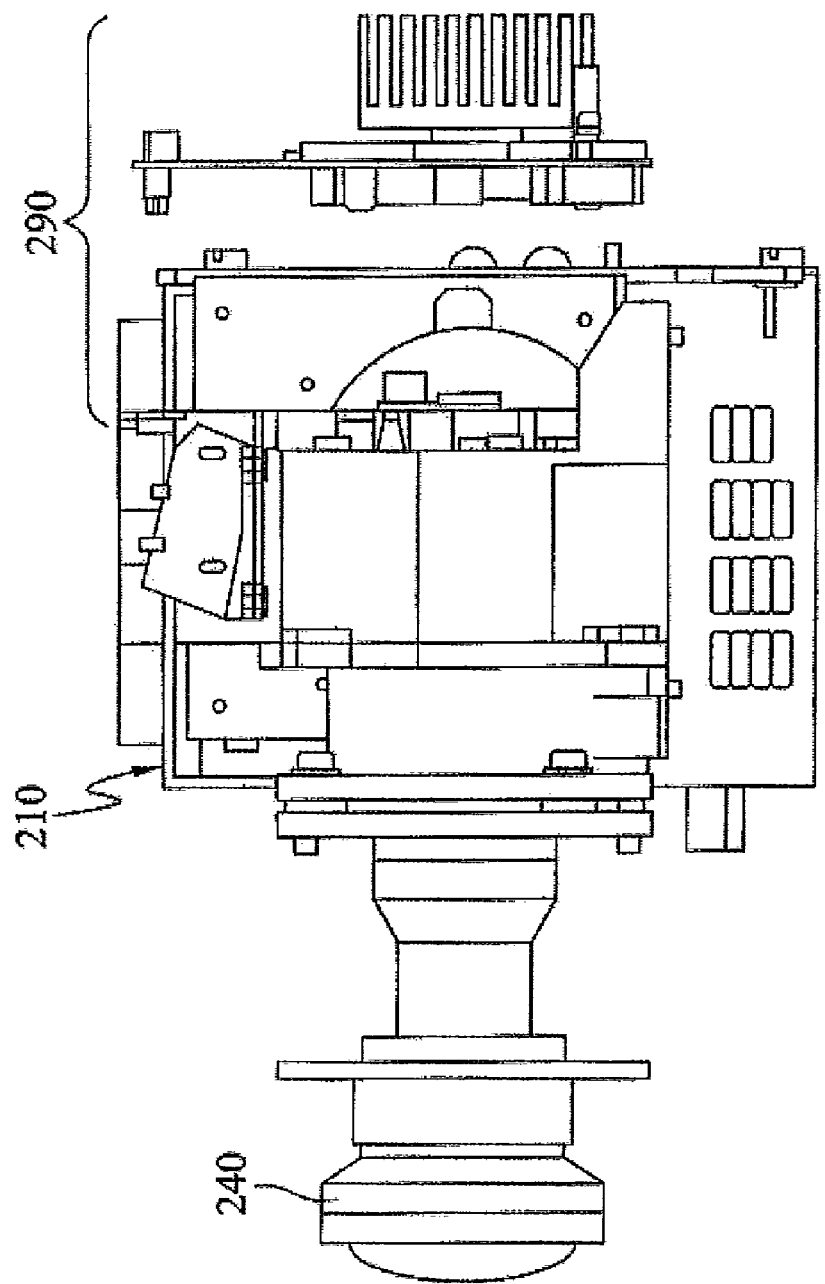
FIG. 2 shows a planer schematic view of the optical engine of a typical transmissive DLP projection apparatus.
Figure 3:
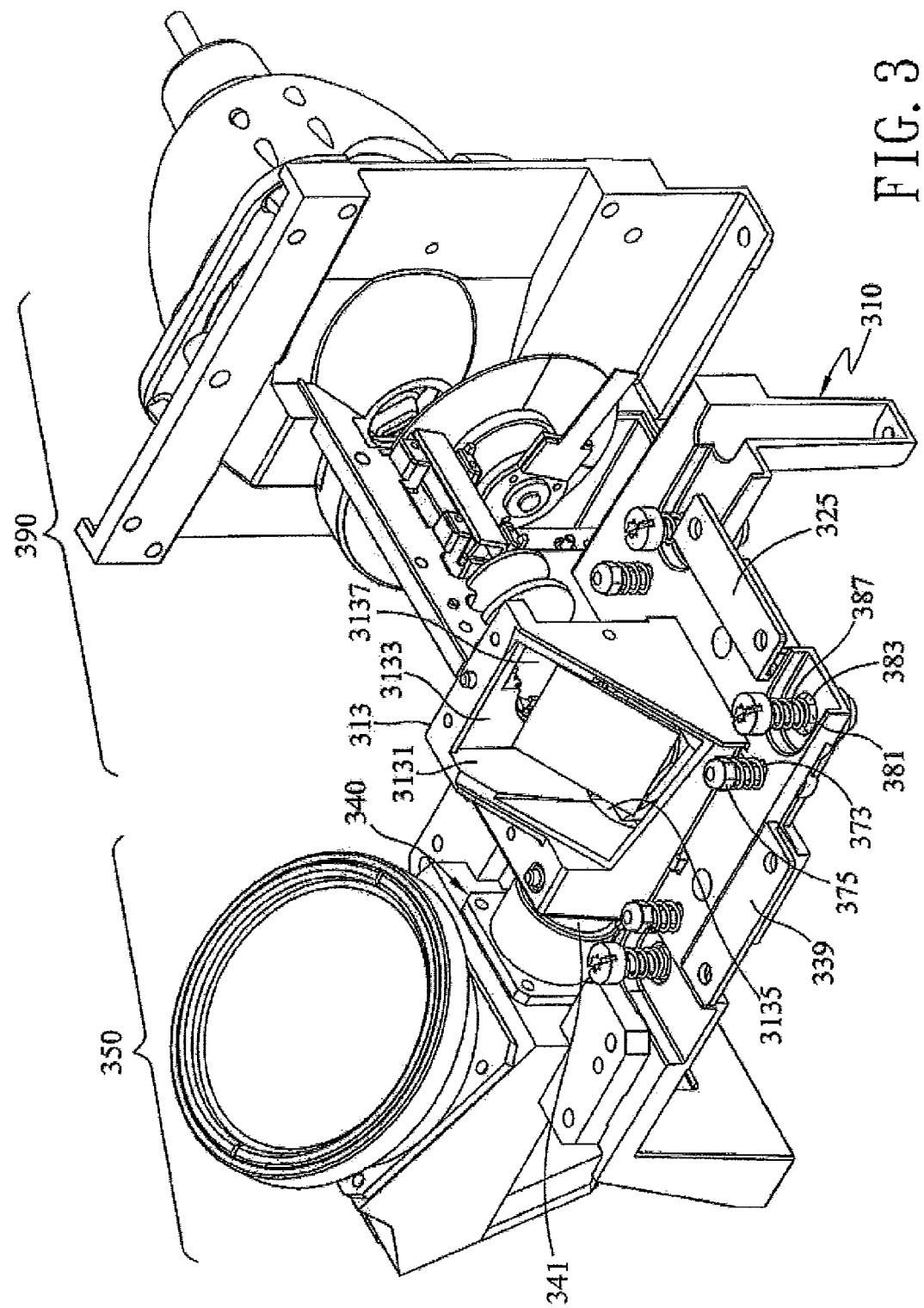
FIG. 3 shows a three dimensional schematic view of the assembled illumination system and the imaging system of the optical engine of the projection apparatus according to this invention.
Figure 4:
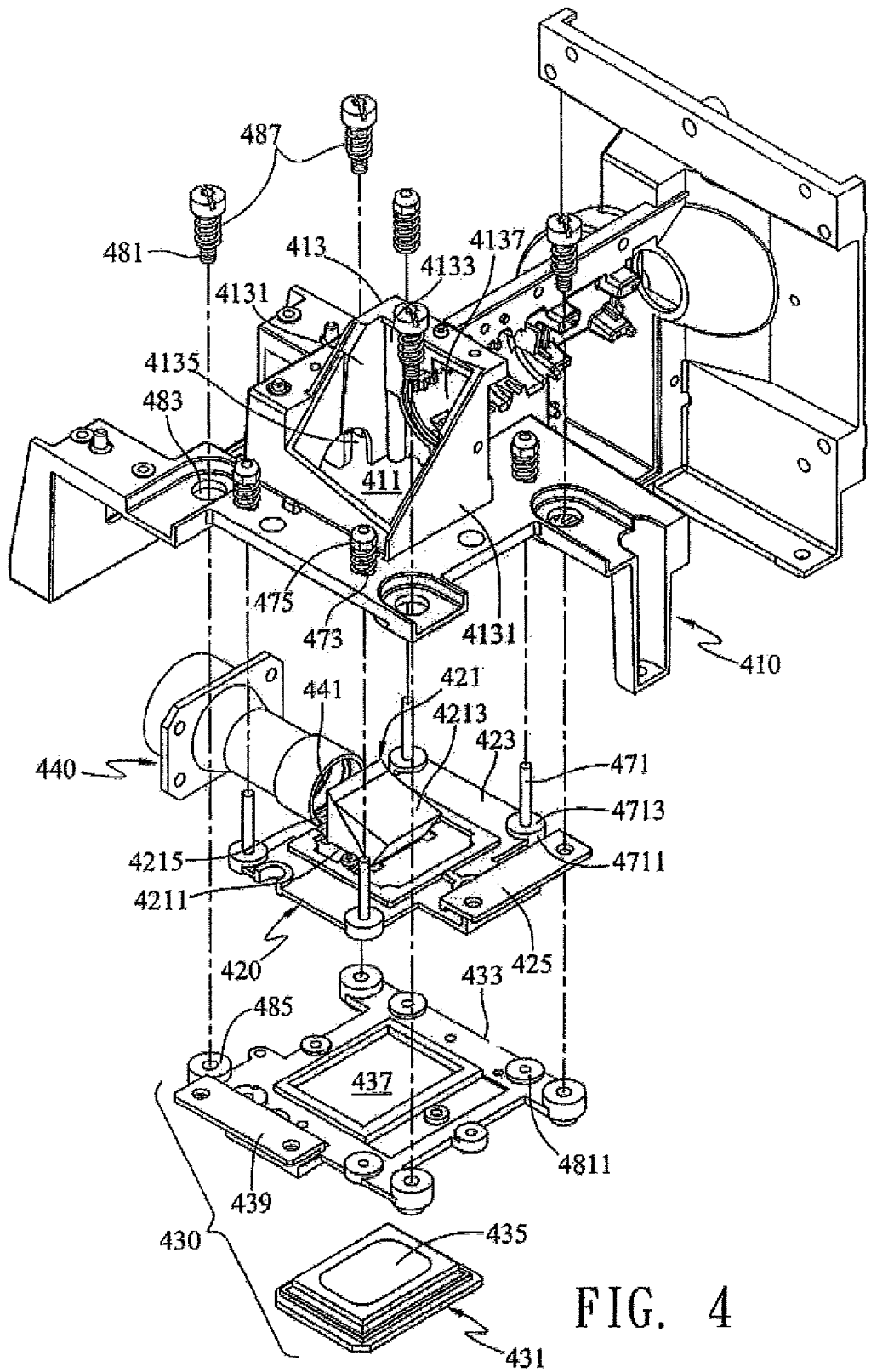
FIG. 4 is an exploded top view illustrating the assembly of FIG. 3.
Figure 5:
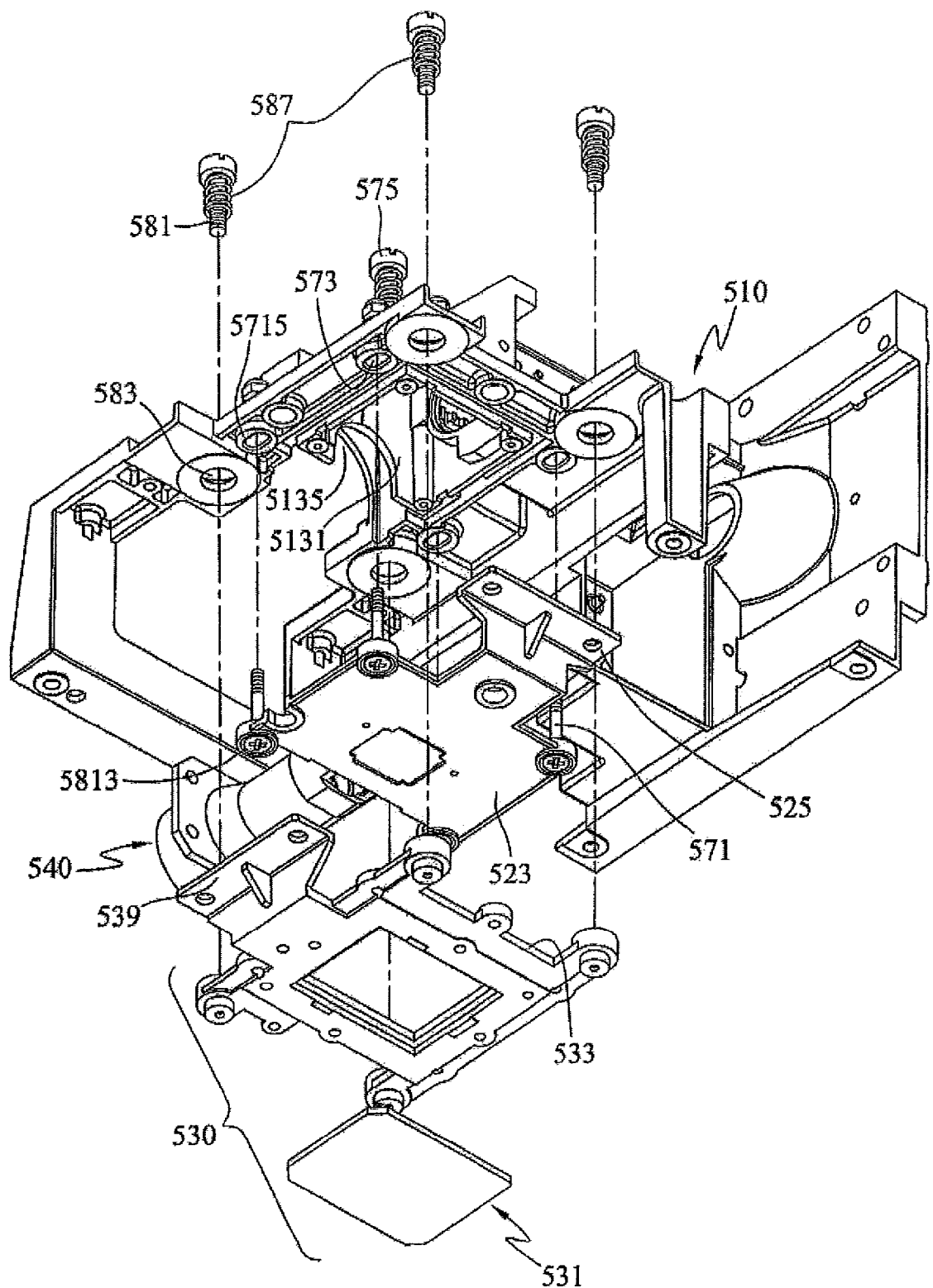
FIG. 5 is a bottom view of FIG. 4.

A preferred embodiment of this invention refers to FIG. 3 to FIG. 5. In FIG. 4, the imaging system comprises a body 410, a prism device 420, a digital micromirror assembly 430, a projection lens assembly 440, a first slide mechanism, a second slide mechanism, a first fastening device and a second fastening device.

Figure 6:
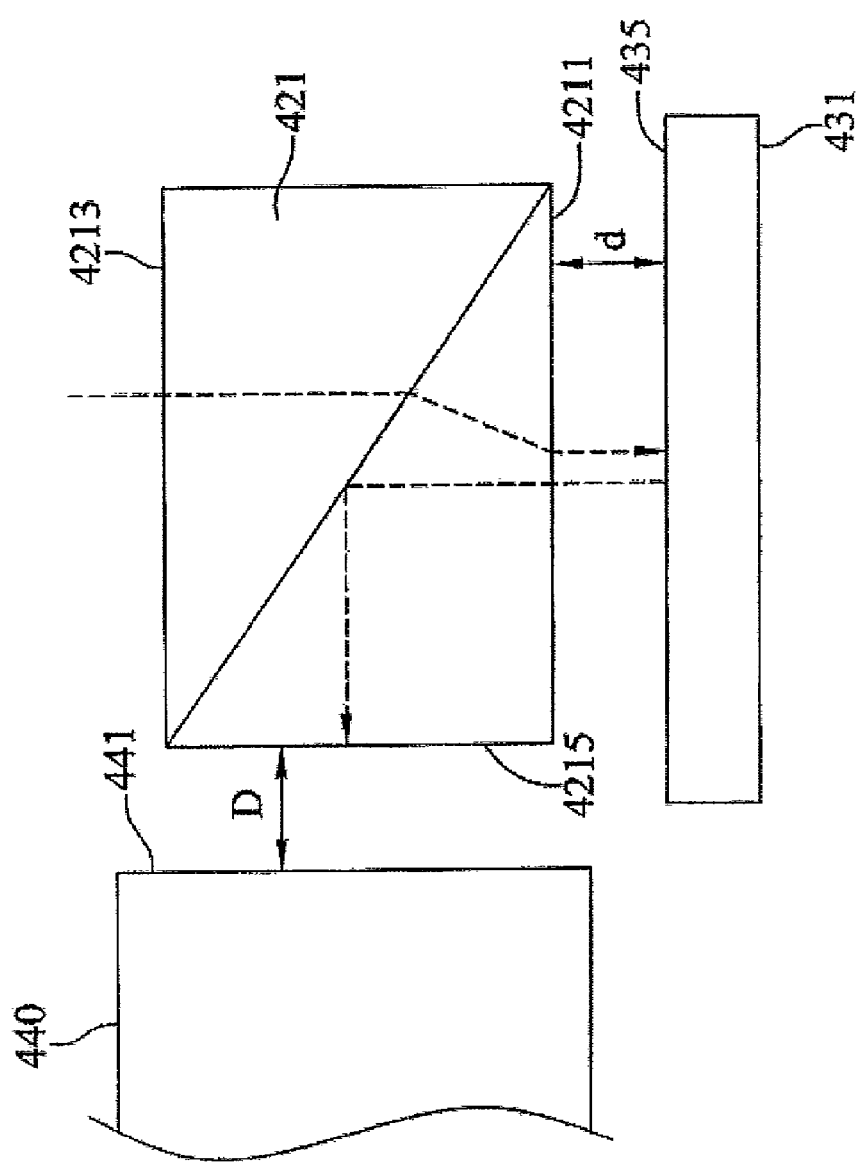
FIG. 6 shows a schematic view of the light passing through the prism device, digital micromirror assembly and projection lens assembly, according to this invention.

In the preferred embodiment, the first fastening device comprises a plurality of first screws 471, a plurality of first apertures 473, and a plurality of nuts 475. The second fastening device comprises a plurality of second screws 481, a plurality of second apertures 483, a plurality of hole seats 485, a plurality of springs 487, and a positioning device. The body 410 comprises a first receiving hole 411. The prism device 420 comprises a prism assembly 421, a first carriage 423, and a first adjustment handle 425. Referring to FIG. 6, the prism assembly 421 comprises a bottom surface 4211, a light input end 4213, and a light output end 4215 that forms an included angle with the other light input end 4213. The digital micromirror assembly 430 comprises a digital micromirror device (DMD) 431 and a second carriage 433. The digital micromirror device 431 comprises an effective optical processing area 435 formed at a top surface thereof. In addition, a receiving hole 437 is formed on the second carriage 433, and the projection lens assembly 440 comprises a light input end 441.

With reference to the embodiment illustrated in FIG. 4, the prism device 420 is connected with the body 410. The digital micromirror assembly 430 comprises an effective optical processing area 435 spaced apart from the bottom surface 4211 of the prism assembly 421 of the prism device 420 by a substantially constant distance d. The projection lens assembly 440 connected with the body 410 is disposed at a side of the prism device 420, wherein the projection lens assembly 440 comprises a light input end 441 spaced apart by a distance D from the light output end 4215 of the prism device 420. In the prism device 420, the prism assembly 421 is located on the first carriage 423 and connected with the body 410 through the first carriage 423. A first slide mechanism of the imaging system is formed between the first carriage 423 and the body 410, such that the prism device 420 and the body 410 form a first relative transverse movement and the distance D is therefore made adjustable. The prism device 420 comprises an adjustment handle 425 extending out from a lateral side of the first carriage 423 for convenient adjustment of the first carriage 423. When a technician performs the first relative transverse movement by displacing the prism device 420 with respect to the body 410, the distance d between the effective optical processing area 435 at the top of the digital micromirror device 431 and the bottom surface 4211 of the prism device 421 remains substantially unchanged.

Further details are illustrated in FIG. 6. In this diagram, the illumination system emits an incident light into the prism assembly 421 through the light input end 4213 of the prism assembly 421. The incident light then reverts into the digital micromirror device 431 from the bottom surface 4211 after proper refraction. After an image signal processes the proper image, the processed image is sent back to the prism assembly 421, where it reflects from the light output end 4215 to the light input end 441 of the projection lens assembly 440; at this point, the image is ready to be projected onto a screen. Unlike conventional technology which considers both distances d and D, the present invention, for making the image be correctly focused, does not require the adjustment of distance d during the imaging process, as distance d is constant. Consequently, this leaves the primary role of image focusing on distance D, an easier factor for the operator to carry out. This conceptual arrangement simplifies the focus adjustment mechanism, resulting in a greatly improved focused image quality.

In addition to the quality of the focus, another important factor that influences the image quality of the projection apparatus is the position of the image presented on the screen. The precise position of the image relies on whether the image processed by the effective optical processing area 435 of the digital micromirror device 431 can be completely emitted into the bottom surface 4211 of the prism assembly 421 and then precisely reflected into the projection lens assembly 440. To facilitate the position adjustment mechanism, this invention provides an easily adjusted and positioned slide relation between the digital micromirror device 431 and the prism assembly 421.

The digital micromirror device 431 is positioned on the second carriage 433 of the digital micromirror device 431 and connected with the body 410 through the second carriage 433. The imaging system comprises a second slide mechanism between the second carriage 433 and the prism device 420. In addition, the digital micromirror assembly 430 and the prism device 420 form a second relative transverse movement to adjust a relative position between the effective optical processing area 435 of the digital micromirror device 431 and the bottom surface 4211 of the prism assembly 421. In particular, the digital micromirror assembly 430 comprises a second adjustment handle 439 extending out from a back side of the second carriage 433 for the convenient positional adjustment of the second carriage 433.

A first receiving hole 411 is formed on the body 410. There is a surrounding partition 413 comprising two opposing walls 4131 and a front wall 4133 outside the first receiving hole 411. A lateral hole 4135, corresponding to the light input end 441 of the projection lens assembly 440, is formed on one of the two opposing walls 4131. A front hole 4137 is formed on the front wall 4133 for receiving an even light source supplied by the illumination system of the body 410. When the prism device 420 is connected with the body 410 through the first carriage 423, the prism assembly 421 fits into the first receiving hole 411, surrounded by the partition 413. The light output end 4215 of the prism assembly 421 is adapted to be aligned with the lateral hole 4135. A second receiving hole 437 is formed on the second carriage 433 of the imaging system, wherein the second carriage 433 connects with the body 410 when (1) the digital micromirror device 431 is inserted through and positioned in the second receiving hole 437, and (2) the bottom surface 4211 of the prism assembly 421 is aligned with the effective optical processing area 435 of the digital micromirror device 431.

The prism device 420 is connected with the body 410 by the first fastening device. In the first fastening device, a plurality of first screws 471 extends upward from the first carriage 423. A plurality of first apertures 473 formed on the body 410 is provided to accommodate the plurality of first screws 471 inserting therethrough. Each first aperture 473 has an inner diameter greater than the outer diameter of each first screw 471. A plurality of nuts 475 fastens the plurality of first screws 471 in the plurality of first apertures 473 respectively. The first fastening device comprises 4 screws, 4 apertures, and 4 nuts uniformly distributed in this embodiment.

The digital micromirror assembly 430 is connected with the body 410 by the second fastening device. In the second fastening device, a plurality of second apertures 483 formed on the body 410 is formed to accommodate a plurality of second screws 481 inserting therethrough. Each of the second apertures 483 has an inner diameter greater than the outer diameter of each second screw 481. A plurality of hole seats 485 is provided on the second carriage 433 so that the plurality of second screws 481 can pass through the plurality of second apertures 483 and fasten in the plurality of second apertures 483. The second fastening device comprises 4 screws, 4 apertures, and 4 hole seats uniformly distributed in this embodiment.

To facilitate the ease of a second relative transverse movement, in which the digital micromirror assembly 430 displaces with respect to the prism device 420, a plurality of springs 487, comprised in the second fastening device, is disposed onto the plurality of second screws 481. A positioning device comprised in the second fastening device is provided to fasten the digital micromirror assembly 430 and the prism device 420 in position after adjusting through the second relative transverse movement.

With reference to both FIG. 4 and FIG. 5, each of the aforementioned plurality of first screws 471 comprises a head 4711 connected with the first carriage 423, a first top slide surface 4713 formed on the top of the head 4711, and a first bottom slide surface 5715 formed on the outside of each of the plurality of first apertures 473 and at the bottom of the body 410. The first top slide surface 4713 and the first bottom slide surface 5715 define the first slide mechanism that enables the prism device 420 to perform the first relative transverse movement with respect to the body 410.

Each of the plurality of hole seats 485 of the second fastening device comprises a second top slide surface 4811 formed on the second carriage 433, and a second bottom slide surfaces 5813 formed under the prism device 420. The second top slide surface 4811 and the second bottom slide surfaces 5813 define the second slide mechanism enabling the prism device 420 to perform the second relative transverse movement with respect to the digital micromirror assembly 430.

The disclosure of this invention is primarily to employ the transversely adjustable relative movements both between the prism device and the body, as well as between the digital micromirror assembly and the prism device. By doing so, the quality of focus and the imaging position produced by the imaging systems are more precise. The fastening device between the elements, which comprises screws, nuts, apertures, hole seats, springs, and positioning devices, is provided to simplify the quality control process and adjustment procedure before shipment, saving repair time when the customer returns the projection apparatus to the factory. Though there are four per set of screws, nuts, apertures, hole seats, and springs, there are only two slide mechanisms. People skilled in this field can derive other equivalent embodiments with different number of elements or different type of elements to change the adjustment technique under the concept of the current design.

The above disclosure is related to the detailed technical contents and inventive features thereof. People skilled in this field may proceed with a variety of modifications and replacements based on the disclosures and suggestions of the invention as described without departing from the characteristics thereof Nevertheless, although such modifications and replacements are not filly disclosed in the above descriptions, they have substantially been covered in the following claims as appended.

What is claimed is:

1. An imaging system for an optical engine of a projection apparatus, comprising:
   a body;
   a prism device, connected with the body, the prism device comprising a prism assembly and the prism assembly comprising a bottom surface, a light input end, and a light output end forming an included angle with the light input end;
   a digital micromirror assembly, disposed under the prism device, the assembly comprising a digital micromirror device (DMD) comprising an effective optical processing area spaced a substantially fixed distance d from the bottom surface of the prism assembly; and
   a projection lens assembly, connected with the body, and disposed at a side of the prism device, wherein the projection lens assembly comprises a light input end spaced a distance D from the light output end of the prism device;
   wherein:
   the prism device further comprises a carriage, the prism assembly is positioned on the carriage, and the prism assembly is connected with the body through the carriage;
   the imaging system further comprises a slide mechanism disposed between the carriage and the body, such that the prism device is adapted to move transversely, relative to the body of the optical engine whereby the distance D is made being adjustable.

2. The imaging system of claim 1, wherein the body is provided with a receiving hole formed thereon and a surrounding partition which comprises two opposing walls and a front wall, in which one of the opposing walls is formed with a lateral hole corresponding to the light input end of the projection lens assembly, and the front wall is formed with a front hole for receiving light supplied from an illumination system of the body; when the prism device is connected with the body, the prism assembly is inserted through the receiving hole and located within a space defined by the surrounding partition, whereas the light output end of the prism assembly is positioned to correspond to the lateral hole.

3. The imaging system of claim 2, further comprising a fastening device, the prism device connected with the body through the fastening device, wherein the fastening device comprises:
   a plurality of screws extending up from the carriage;
   a plurality of apertures formed on the body for the plurality of screws inserting therethrough; and
   a plurality of nuts being adapted to fasten the plurality of screws in the plurality of apertures.

4. The imaging system of claim 3, wherein each of the plurality of screws comprises a head connected with the carriage, the head is formed with a top slide surface at a top thereof, and the body is formed with a bottom slide surface on an outside of each of the plurality of apertures at a bottom of the body, in which the bottom slide surface and the top slide surface define the slide mechanism enabling the prism device to move transversely with respect to the body.

5. The imaging system of claim 1, wherein the prism device comprises an adjustment handle extending from a side of the carriage thereby the carriage is adjustable conveniently.

6. An imaging system for an optical engine of a projection apparatus, comprising:

a body;

a prism device, connected with the body, the prism device comprising a prism assembly and the prism assembly comprising a bottom surface, a light input end, and a light output end forming an included angle with the light input end;

a digital micromirror assembly, disposed under the prism device, the assembly comprising a digital micromirror device (DMD) comprising an effective optical processing area spaced a substantially fixed distance d from the bottom surface of the prism assembly; and a projection lens assembly, connected with the body, and disposed at a side of the prism device, wherein the projection lens assembly comprises a light input end spaced a distance D from the light output end of the prism device;

wherein:

the digital micromirror assembly comprises a carriage, the digital micromirror device is positioned on the carriage and connected with the body through the carriage;

the imaging system further comprises a slide mechanism disposed between the carriage and the prism device, such that the digital micromirror assembly is adapted to move transversely, relative to the prism device whereby the effective optical processing area is displaceable with the bottom surface of the prism device.

7. The imaging system of claim 6, wherein the carriage is formed with a receiving hole; when the carriage is connected with the body, the digital micromirror device is adapted to be inserted and positioned at the receiving hole, whereby the bottom surface of the prism assembly is adapted to correspond to the effective optical processing area.

8. The imaging system of claim 7, further comprising a fastening device, the digital micromirror assembly connected with the body through the fastening device, wherein the fastening device comprises:

a plurality of screws;

a plurality of apertures, formed on the body for the plurality of screws inserting therethrough; and a plurality of hole seats, formed on the carriage, whereby the plurality of screws are fastened in the plurality of apertures through the plurality of apertures.

9. The imaging system of claim 8, wherein the fastening device further comprises a plurality of springs and a positioning device, the plurality of springs are disposed onto the plurality of respective screws for an user to transversely displace the digital micromirror assembly, with respect to the prism device, into a position whereby the positioning device is adapted to position the digital micromirror assembly with the prism device.

10. The imaging system of 8, wherein each of the plurality of hole seats comprises a top slide surface formed on the carriage, and the prism device is provided with a plurality of bottom slide surfaces formed at a bottom thereof, the plurality of bottom slide surfaces and the top slide surface define the slide mechanism enabling the prism device transversely move with respect to the digital micromirror assembly.

11. The imaging system of claim 6, wherein the digital micromirror assembly further comprises an adjustment handle extending out from a back side of the carriage to facilitate an user's adjusting the carriage.

12. An imaging system for an optical engine of a projection apparatus, comprising:

a body;

a prism device, connected with the body, the prism device comprising a prism assembly and the prism assembly comprising a bottom surface, a light input end, and a light output end forming an included angle with the light input end;

a digital micromirror assembly, disposed under the prism device, the assembly comprising a digital micromirror device (DMD) comprising an effective optical processing area spaced a substantially fixed distance d from the bottom surface of the prism assembly; and a projection lens assembly, connected with the body, and disposed at a side of the prism device, wherein the projection lens assembly comprises a light input end spaced a distance D from the light output end of the prism device;

wherein:

the prism device comprises a first carriage, the prism assembly is positioned on the first carriage, and the prism assembly is connected with the body through the first carriage;

the imaging system further comprises a first slide mechanism disposed between the first carriage and the body, such that the prism device is adapted to transversely move with respect to the body, whereby the distance D is made being adjustable;

the digital micromirror assembly comprises a second carriage, the digital micromirror device is located on the second carriage and connected with the body through the second carriage;

the imaging system further comprises a second slide mechanism disposed between the second carriage and the prism device, such that the digital micromirror assembly is adapted to move transversely with respect to the prism device, whereby the effective optical processing area is displaceable with the bottom surface of the prism device.

13. The imaging system of claim 12, wherein the body is provided with a first receiving hole formed thereon and a surrounding partition which comprises two opposing walls and a front wall, in which one of the opposing walls is formed with a lateral hole corresponding to the light input end of the projection lens assembly, and the front wall is formed with a front hole for receiving light supplied from an illumination system of the body; when the prism device is connected with the body, the prism assembly is inserted through the first receiving hole and located within a space defined by the surrounding partition, whereas the light output end of the prism assembly is positioned to correspond to the lateral hole.

14. The imaging system of claim 13, wherein the carriage is formed with a second receiving hole; when the carriage is connected with the body, the digital micromirror device is adapted to be inserted and positioned at the second receiving hole, whereby the bottom surface of the prism assembly is adapted to correspond to the effective optical processing area.

15. The imaging system of claim 13, further comprising a first fastening device, the prism device connected with the body through the first fastening device, wherein the fastening device comprises:

a plurality of first screws extending up from the carriage;

a plurality of first apertures formed on the body for the plurality of first screws inserting therethrough; and a plurality of nuts being adapted to fasten the plurality of first screws in the plurality of first apertures.

16. The imaging system of claim 15, further comprising a second fastening device, the digital micromirror assembly connected with the body through the second fastening device, wherein the second fastening device comprises:
- a plurality of second screws;
- a plurality of second apertures, formed on the body for the plurality of second screws inserting therethrough; and
- a plurality of hole seats, formed on the second carriage, whereby the plurality of second screws are fastened in the plurality of second apertures through the plurality of second apertures.

17. The imaging system of claim 16, wherein the second fastening device further comprises a plurality of springs and a positioning device, the plurality of springs are disposed onto the plurality of respective second screws for an user to transversely displace the digital micromirror assembly, with respect to the prism device, into a position whereby the positioning device is adapted to position the digital micromirror assembly with the prism device.

18. The imaging system of claim 15, wherein each of the plurality of first screws comprises a head connected with the first carriage, the head is formed with a top slide surface at a top thereof, and the body is formed with a first bottom slide surface on an outside of each of the plurality of apertures at a bottom of the body, in which the first bottom slide surface and the first top slide surface define the first slide mechanism enabling the prism device to move transversely with respect to the body.

19. The imaging system of 16, wherein each of the plurality of hole seats comprises a second top slide surface formed on the second carriage, and the prism device is provided with a plurality of second bottom slide surfaces formed at a bottom thereof, the plurality of second bottom slide surfaces and the second top slide surface define the second slide mechanism enabling the prism device transversely move with respect to the digital micromirror assembly.

20. The imaging system of claim 12, wherein the prism device comprises a first adjustment handle extending from a side of the first carriage facilitate an user's adjusting the first carriage; and wherein the digital micromirror assembly further comprises a second adjustment handle extending out from a back side of the second carriage to facilitate an user's adjusting the second carriage.

* * * * *